's Patent [19]

Pavlick

[11] Patent Number: 4,653,683
[45] Date of Patent: Mar. 31, 1987

[54] MEANS AND METHOD FOR SECURING A TUBULAR MEMBER TO A SIDE FRAME OF A RAIL CAR TRUCK

[75] Inventor: Michael J. Pavlick, Norristown, Pa.

[73] Assignee: The Budd Company, Troy, Mich.

[21] Appl. No.: 685,862

[22] Filed: Dec. 24, 1984

[51] Int. Cl.⁴ .............................................. B23K 31/02
[52] U.S. Cl. .................................... 228/182; 285/192
[58] Field of Search ................................ 228/182–189, 228/138; 285/192, 286, 62, 63

[56] References Cited

U.S. PATENT DOCUMENTS 3,628,923  12/1971  White .............................. 228/183 X
4,343,497   8/1982  Bot .................................. 285/286 X

FOREIGN PATENT DOCUMENTS 1206201  2/1960  France ................................ 285/192
55-45572  3/1980  Japan .................................. 228/189

Primary Examiner—Kuang Y. Lin
Attorney, Agent, or Firm—Edward M. Farrell; Herman Foster; Thomas I. Davenport

[57] ABSTRACT

A tubular member for holding a tread brake is inserted through a pair of enlarged openings in a side frame. A pair of washers fit over the tubular member with their outer peripheries welded to opposite sides of the side frame and their inner opening areas being double welded on both sides to the tubular member. The method of assembly involves leaving a top plate off the side frame until final welding steps through one of the enlarged openings has been completed.

2 Claims, 4 Drawing Figures

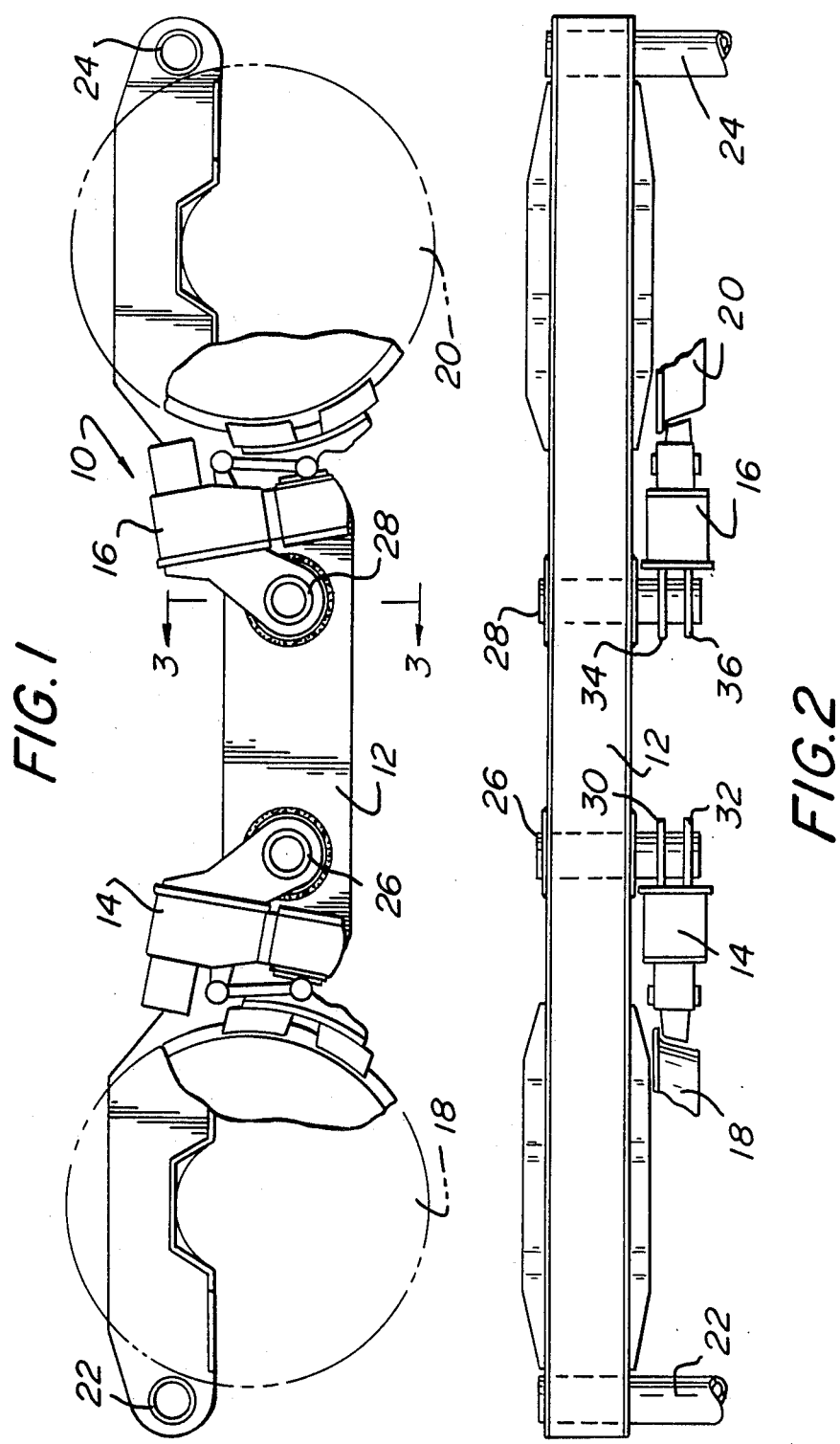

MEANS AND METHOD FOR SECURING A TUBULAR MEMBER TO A SIDE FRAME OF A RAIL CAR TRUCK

BACKGROUND OF THE INVENTION

The use of tubular members extending through and welded to side frames of a rail car truck is known, as disclosed in a patent to McMullen U.S. Pat. No. 4,211,311. Generally, in this patent and many prior art systems, the tubular members fit through openings in the side frames and welded thereto. The members are then used to support brake mechanisms, such as tread brakes, for contacting the wheels of the rail car during braking operations.

Because the tubular members are welded directly to the side frames, the weld area between the tubular member and side frames is limited to the diameters of the tubular members. Consequently, excessive forces may tend to crack or break the weld joints.

There have been patents which are directed towards increasing the weld areas between two parts to make the weld joints stronger and minimize the likelihood of such joints cracking. Such patents include U.S. Pat. Nos. 2,216,033; 4,348,041; 3,833,245 and 4,423,890. While increasing the weld areas, these patents do not deal with the special problems relating to tubular members welded to side frames in a rail car truck and adapted to hold relatively heavy loads, such as tread brakes.

OBJECTS OF THE INVENTION

It is an object of this invention to provide an improved means for securing a load carrying tubular member to a side frame of a rail car truck.

It is a further object of this invention to provide an improved method of welding a load carrying tubular member to a side frame of a rail car truck.

BRIEF SUMMARY OF THE INVENTION

In accordance with the present invention, improved means and methods are provided for securing a tubular member to a side frame of a truck for a rail car. A pair of elongated openings larger than the diameter of the tubular member are disposed to receive the tubular member therethrough. The peripheries of a pair of washers are welded to opposite sides of the side frame. The washers include inner openings, dimensioned to the diameter of the tubular member, which are welded to the tubular member by double weld joints on opposite sides of each of the inner openings.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is a side view of a typical railway truck illustrating one embodiment of the present invention;

FIG. 2 is a top view of the truck illustrated in FIG. 1;

DESCRIPTION OF THE INVENTION

Figure 3:
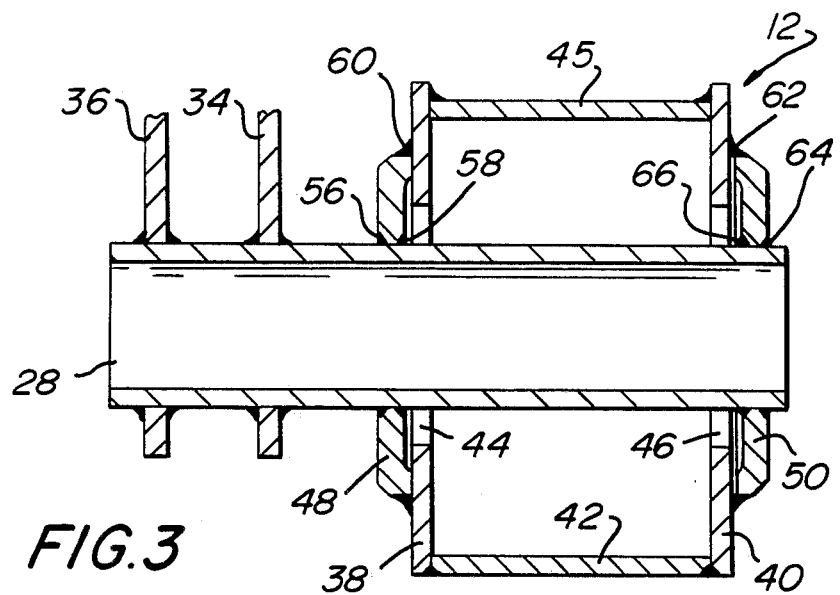
FIG. 3 is a cross-sectional view taken along lines 3—3 of FIG. 1.

Referring to FIGS. 1 and 2, a truck 10 includes a side frame 12 having a pair of tread brakes 14 and 16 mounted thereto. The tread brakes are conventional and are disposed to selectively engage wheels 18 and 20 during a braking operation. A pair of tubes 22 and 24 are secured to the ends of the side frame 12 to receive disc brake mechanisms, not illustrated.

The present invention is directed towards the means and methods of welding a pair of tubular members 26 and 28 to the side frame 12. The tread brakes 14 and 16 are welded to the tubular members 26 and 28 by means of pairs of mounting brackets 30, 32 and 34, 36, respectively.

Figure 4:
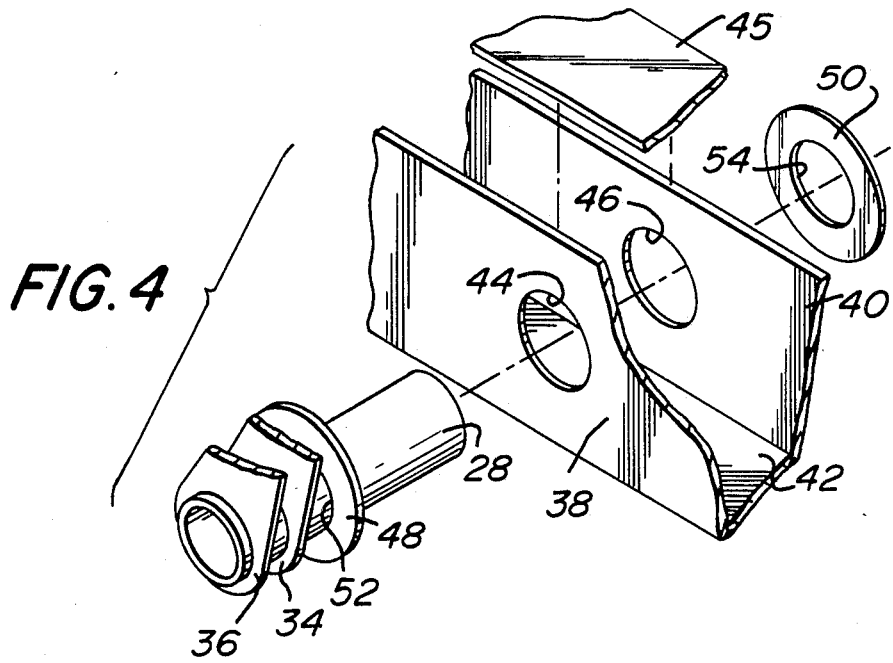
FIG. 4 is an exploded view illustrating the main elements of the present invention and method of assembling them.

Referring to FIGS. 3 and 4, along with FIGS. 1 and 2, only the tubular member 28 and its associated parts will be described in detail, it being understood that the description also applies to tubular member 26, and other similar tubular members which may be connected on a side frame on the opposite side of the truck 10 (not illustrated). FIG. 3 represents a final assembly of the tubular member 28 on the side frame 12. FIG. 4 is presented to illustrate the welding steps which are involved in reaching the final configuration of FIG. 3.

The side frame 12 is formed by side plates 38 and 40, bottom plate 42 and top plate 45 all welded together at the corners as indicated. The top plate 45 is the last element to be welded in the assembly illustrated in FIG. 3. The reason for this is that it is necessary to provide an open access area at the top of the side frame to permit the final welding steps to be completed.

The sides 38 and 40 of the side frame 12 include oversize openings 44 and 46 which are larger in diameter than the tubular member 28. The tubular member 28 extends through the openings 38 and 40. A pair of washers 48 and 50 have their peripheries welded to sides 38 and 40, respectively. The washers 48 and 50 include inner openings 52 and 54, respectively, dimensioned substantially to the same diameters as the diameter of the tubular member 28. Each of the washers 48 and 50 are double welded to the tubular member 28 at the opposite sides of their inner openings 52 and 54.

Referring to FIG. 4, the steps in the method of assembling the arrangement of FIG. 3 is illustrated.

The brackets 34 and 36 may be welded to the tubular member 38. The washer 48 may then be welded to the tubular member 28 by means of double welds 56 and 58 on opposite sides of the opening 52 in the washer 48.

The assembly including the tubular member 28 with the washer 48 is then inserted through the openings 44 and 46 in the sides 38 and 40 prior to attaching the top plate 45. The tubular member is maintained centrally disposed with the openings 44 and 46 by any convenient means while the outer periphery of the washer 48 is welded to the side 38, as by a weld 60.

The washer 50 is then inserted over the tubular member 28 and the periphery of the washer 50 is welded to the side 40 by a weld 62. The washer 50 is then welded to the tubular member 28 by a first weld 64 on a double weld.

With the top plate 45 still unassembled, leaving the side frame 12 with an open top area, the washer 50 is again welded to the tubular member 28 by a second weld 66. The open side frame and enlarged opening 46 makes it possible for a welder to pass a welding gun through the top opening of the side frame and through the enlarged opening 46 to produce the weld 66. After the weld 66 has been made, the top plate 45 is welded to the side plates 38 and 40 to enclose the side frame 12.

Variation in the sequence of the steps described are possible. For example, in some cases, before mounting the brackets 34 and 36, the washer 50 may be first welded to the tubular member 28. In this case, the final welds would be made on the washer 48 with the weld 58 being the last one made through the enlarged opening 44.

It is seen that the welding area of the welds 60 and 62 are greater than the welding areas of prior art tubes connected to side frames. The double welds of the washers to the tubes also provide strength in the welds. The overall increase in the welding area make it possible for the tubular members to sustain greater forces produced by tread brakes while minimizing the likelihood of producing cracks in the weld joints.

What is claimed is:

1. In combination,
    (a) a tubular member for supporting a tread brake assembly;
    (b) an enclosed side frame for a railway car formed by a pair of side walls, a bottom wall and a top wall;
    (c) each of said side walls having a pair of enlarged openings therein larger than the diameter of said tubular member for receiving said tubular member therethrough and being large enough to permit a welding gun to be passed therethrough when said tubular member is in place;
    (d) first and second washer members each having a central opening to fit around said tubular member in close proximity therewith and on opposite sides of said side frame;
    (e) means for welding the outer peripheries of said washer members to outer sides of said side frame on said pair of side walls to maintain said tubular member centrally disposed within said enlarged openings; and
    (f) means for welding said first and second washer members on both sides of their central openings to said tubular member.

2. A method of welding a tubular member to a side frame of a railway car to carry tread brakes thereon comprising the steps of:
    (a) providing a "U" shaped member having two sides and an open top area;
    (b) providing said tubular member;
    (c) forming openings in two sides of said "U" shaped member larger in diameters than the diameter of said tubular member;
    (d) welding a first washer having an outer diameter larger than the diameters of said openings on said tubular member;
    (e) inserting said tubular member through said openings until said first washer contacts one of two sides, with said tubular member being centrally disposed within said openings;
    (f) welding the outer periphery of said first washer to said one of two said sides;
    (g) welding the outer periphery of a second washer to said other of said two sides;
    (h) welding said second washer to said tubular member through the opening in said other of two said sides; and
    (i) welding a top plate on said "U" shaped member to close said top opening.

* * * * *